US008187777B2

(12) United States Patent
Won

(10) Patent No.: US 8,187,777 B2
(45) Date of Patent: May 29, 2012

(54) METHOD FOR MANUFACTURING PATTERNED LAYER ON SUBSTRATE

(75) Inventor: Chinchung John Won, Los Altos, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/979,443

(22) Filed: Dec. 28, 2010

(65) Prior Publication Data

US 2011/0090290 A1 Apr. 21, 2011

Related U.S. Application Data

(62) Division of application No. 11/938,463, filed on Nov. 12, 2007, now Pat. No. 7,901,036.

(51) Int. Cl.
*G02B 5/20* (2006.01)

(52) U.S. Cl. ............................... 430/7; 349/113; 347/12

(58) Field of Classification Search ........ 430/7; 347/12, 347/15, 106, 107; 349/113–115
See application file for complete search history.

(56) References Cited

U.S. PATENT DOCUMENTS 7,183,023 B2 * 2/2007 Sonehara et al. ................. 430/7
8,048,599 B2 * 11/2011 Lo et al. ............................ 430/7
8,089,592 B2 * 1/2012 Kwon et al. ................. 349/115
2002/0145640 A1 10/2002 Anderson et al.

FOREIGN PATENT DOCUMENTS

| | | |
|---|---|---|
| JP | 2003-131022 A | 5/2003 |
| TW | 559594 | 11/2003 |
| TW | I269073 | 12/2006 |
| TW | I277526 | 4/2007 |
| TW | I287145 | 9/2007 |

* cited by examiner

*Primary Examiner* — Lamson Nguyen
(74) *Attorney, Agent, or Firm* — Altis Law Group, Inc.

(57) ABSTRACT

A method for manufacturing a patterned layer on a substrate with a print head unit includes mounting a print head unit to an ink-jet device, the print head unit including at least two side print heads and one central print head, the print heads each comprising a nozzle line, rotationally moving at least one of the side print heads relative to the central pint head to achieve parallelism, rotating the print head unit around a rotating axis perpendicular to the substrate, linearly moving the side print heads along the respective nozzle line thereof to correspond to pitches of the nozzles and that of the cells on the substrate, depositing ink into the cells on the substrate, and solidifying the ink so as to form a patterned layer on the substrate.

5 Claims, 9 Drawing Sheets

METHOD FOR MANUFACTURING PATTERNED LAYER ON SUBSTRATE

CROSS-REFERENCE TO RELATED APPLICATION

The present application is a divisional application of U.S. patent application Ser. No. 11/938,463, filed on Nov. 12, 2007.

BACKGROUND

1. Technical Field

The disclosure generally relates to a print head unit, particularly, to a print head unit and a method for manufacturing a patterned layer on a substrate with the print head unit.

2. Discussion of Related Art

Popularly used procedures for manufacturing a color filter include a pigment-dispersal method and an ink-jet method.

The pigment-dispersal method, widely used, utilizes color pigment photoresists forming red, green and blue sub-pixels by means of a spin-exposure-development. Specifically, red pigment photoresist, blue pigment photoresist and green pigment photoresist are sequentially applied to a glass substrate with a black matrix, exposed to the ultraviolet-light with the help of a photomask after drying, and developed to form red sub-pixel, green sub-pixel, and blue sub-pixel color layers respectively. Since the process is repeated three or more times, these manufacturing devices are both expensive to use and time-consuming to operate.

The ink-jet method uses an ink-jet device with at least one print head for depositing ink into a predetermined position on a substrate structure. A patterned layer is formed after solidifying the ink. Generally, for areas of the substrate structure exceeding a covering area of the print head, the print head of the ink jet device moves relatively in a matrix manner with the substrate to finish depositing the ink on the substrate.

The ink jet method is different from the pigment-dispersal method. In the ink jet method, each of R, G, and B ink is sprayed onto a substrate from respective nozzles of print heads to form a color layer. When the ink jet method is employed, the required amount of ink can be applied onto a required location at a specific time. Accordingly, almost no ink is wasted. Furthermore, since the sub-cells of R, G, and B can be formed simultaneously, the coloring time is reduced, and it is possible to conserve considerable cost.

Since the pitches between the nozzles of the conventional print head do not vary, they may not correspond to those of the corresponding cells in the color filter. In order to coordinate the two, it is necessary to rotate the print head about an axis perpendicular to the substrate, such that the projection of the nozzle on the substrate perpendicular to the printing direction is as the same as that of the cells in the same direction.

What is needed, therefore, is a print head unit to hold and adjust the print heads in multi degree-of-freedoms independently such that the pitches of the nozzles conform to those of the cells.

SUMMARY

A print head unit for manufacturing a patterned layer on a substrate is provided. The print head unit includes a first print head, a second print head, a third print head, and a print head frame. The first print head includes a first nozzle line with a plurality of nozzles arranged in a line. The second print head includes a second nozzle line with a plurality of nozzles arranged in a line. The third print head includes a third nozzle line with a plurality of nozzles arranged in a line. The print head frame is configured for mounting the first print head, the second print head, and the third print head thereon. The first nozzle line, the second nozzle line, and the third nozzle line are substantially parallel with each other. The second print head is mounted between the first print head and the third print head. The first print head and the third print head are pivotally mounted on the print head frame. The print head unit further includes parallel adjustment and position adjustment. The parallel adjustment configured for rotationally moving at least one of the first print head and the third print head relative to the second print head so as to adjust the parallelism between the first nozzle line, the second nozzle line, and the third nozzle line. The position adjustment is configured for linearly moving at least one of the first print head and the third print head along the respective nozzle line thereof.

A print head unit for manufacturing a patterned layer on a substrate is provided. The print head unit includes at least two side print heads, one central print head disposed between the side print heads, and a print head frame. The side print heads and the central print head respectively include a nozzle line with a plurality of nozzles arranged in a line. The side print heads and the central print head are arranged in a manner that all the print heads are rotatable about a rotating axis of the print head unit and the nozzle line of the central print head crosses the rotating axis. The print head unit further includes parallel adjustment and position adjustment. The parallel adjustment is configured for rotationally moving at least one of the side print heads relative to the central print head so as to adjust parallelism between the nozzle lines of the side print heads. The position adjustment is configured for linearly moving the side print heads along the respective nozzle line thereof independently.

A method for manufacturing a patterned layer on a substrate with the print head unit is provided. The method including the steps of: mounting a print head unit to an ink-jet device, wherein the print head unit comprises at least two side print heads and one central print head disposed between the side print heads, the side print heads and the central print head each comprises a nozzle line with a plurality of nozzles arranged in a line, the side print heads and the central print head are arranged in a manner that all the print heads are rotatable about a rotating axis of the print head unit and the nozzle line of the central print head crosses the rotate axis; rotationally moving at least one of the side print heads relative to the central pint head to achieve parallelism between the side print heads and the central print head; rotating the print head unit around the rotate axis perpendicular to the substrate; linearly moving the side print heads along the respective nozzle line thereof to correspond to pitches of the nozzles of the side print heads and that of the cells on the substrate; depositing ink into the cells on the substrate; and solidifying the ink so as to form a patterned layer on the substrate.

BRIEF DESCRIPTION OF THE DRAWINGS

Many aspects of the present print head unit and method for manufacturing a patterned layer on a substrate using the same can be better understood with reference to the following drawings. The components in the drawings are not necessarily drawn to scale, the emphasis instead being placed upon clearly illustrating the principles of the present print head unit and method. Moreover, in the drawings, like reference numerals designate corresponding parts throughout the several views.

Figure 1:
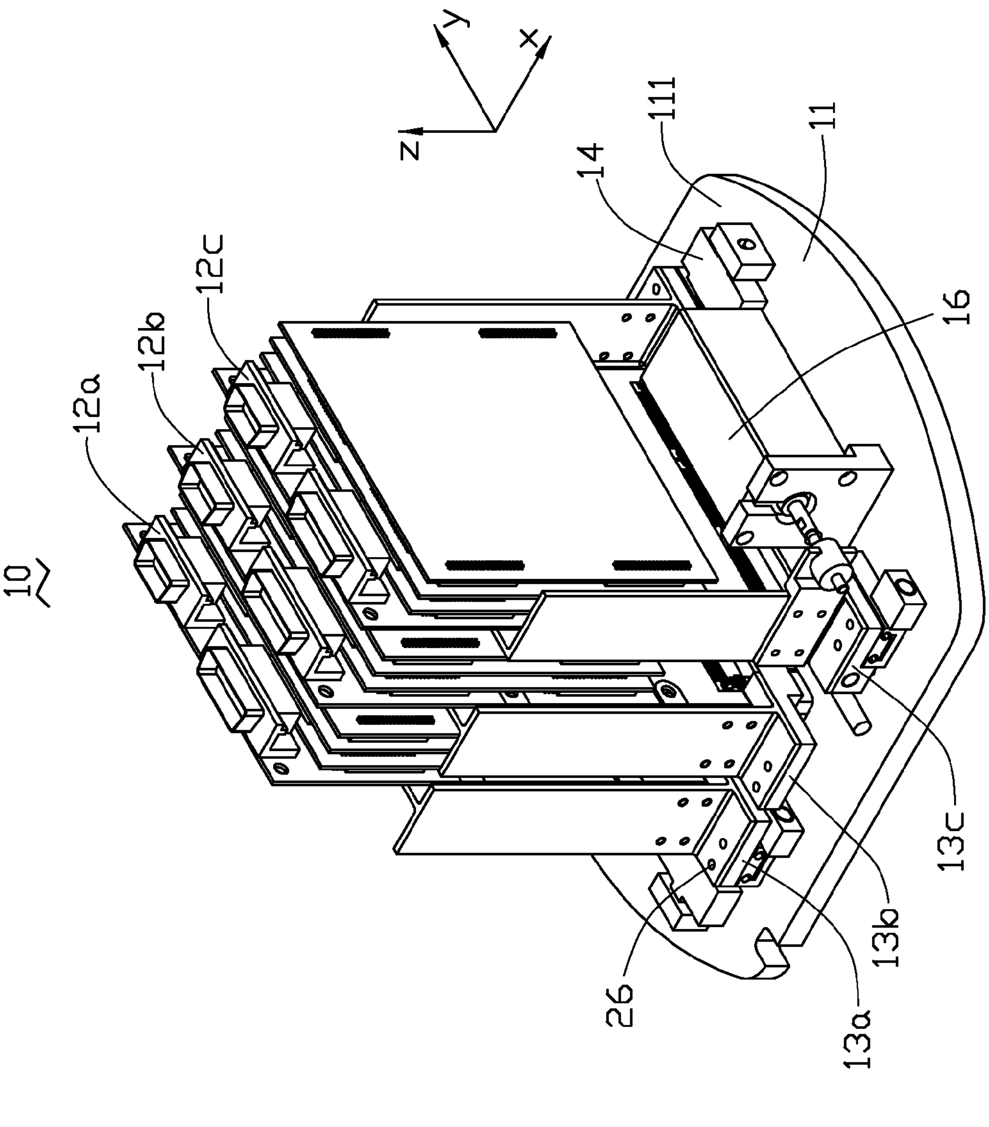
FIG. 1 is a perspective view of a print head unit in accordance with a preferred embodiment.

Corresponding reference characters indicate corresponding parts throughout the drawings. The exemplifications set out herein illustrate at least one preferred embodiment of the present print head unit and its related method, in one form, and such exemplifications are not to be construed as limiting the scope of the invention in any manner.

DETAILED DESCRIPTION OF THE EMBODIMENT

The preferred embodiments of the disclosure will now be described with reference to the attached drawings. A print head unit including machined parts, sensors and actuators, is provided. The machined parts mainly include a print head frame, print heads, and adapter bars configured for holding print heads. The print heads and adapter bars are mounted on the print head frame. The sensors include optical encoders, capacitive sensors, or thermocouples. The actuators include screw adjusters, piezo actuators/motors, or stepper motors.

Figure 2:
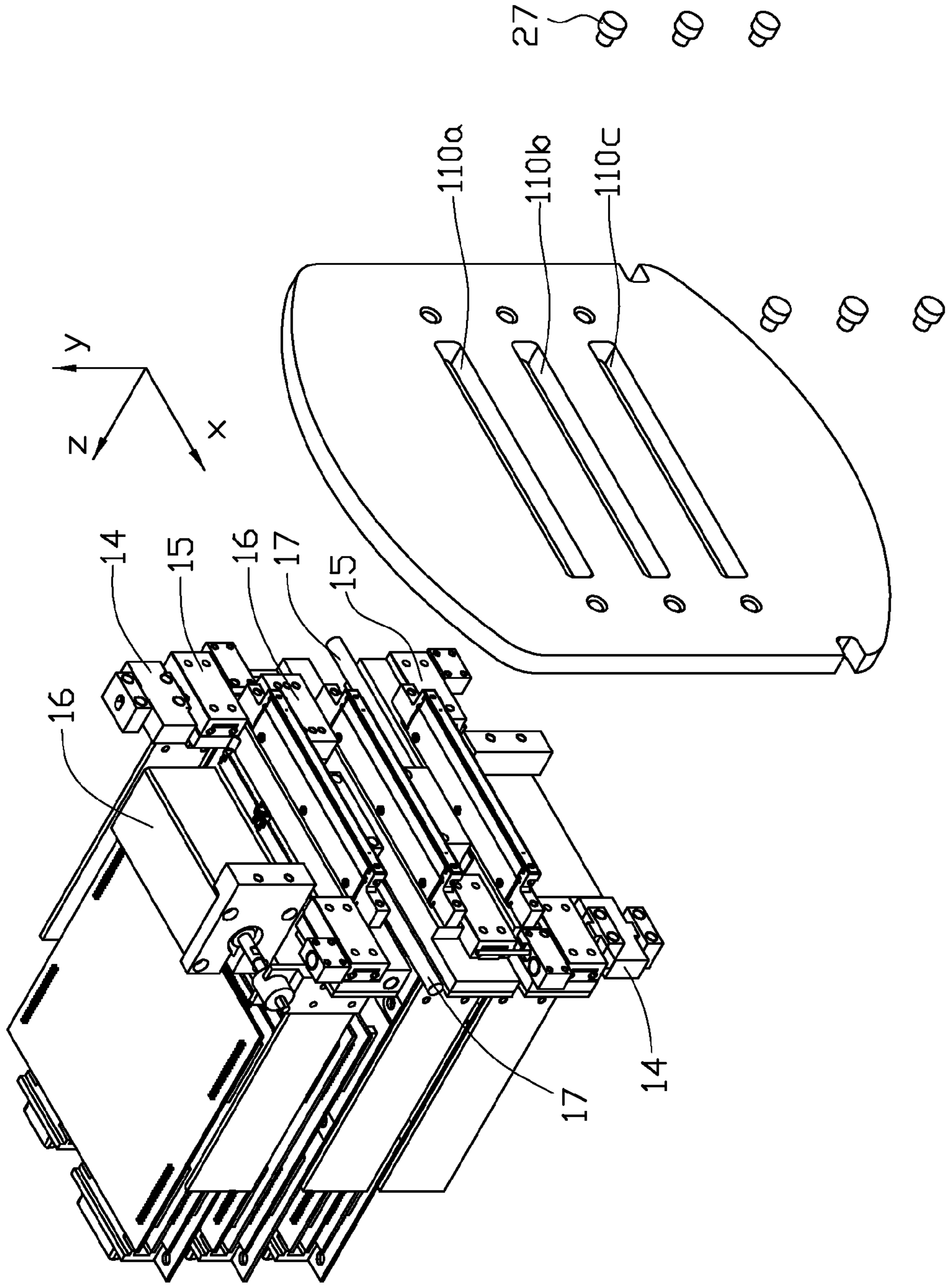
FIG. 2 is an exploded perspective view of the print head unit shown in FIG. 1.

With reference to FIGS. 1 and 2, a print head unit 10 includes a print head frame 11, print heads (12*a*, 12*b*, and 12*c*), and adapter bars (13*a*, 13*b*, and 13*c*) configured for holding the print heads (12*a*, 12*b*, and 12*c*). The print heads (12*a*, 12*b*, and 12*c*) and the adapter bars are (13*a*, 13*b*, and 13*c*) are mounted on the print head frame 11. The print head unit 10 can rotate about an axis that will be referred to as the z-axis in FIG. 1. To more thoroughly describe the location and the movement of the components in the print head unit 10, an x-axis runs horizontally as shown in FIG. 2 and y-axis runs vertically as shown in FIG. 2.

The print head 12*a* for discharging red (R) ink is mounted into the adapter bar 13*a* and locked by screws 26 at two ends of the print head 12*a*, the print head 12*b* for discharging green (G) ink is mounted in the adapter bar 13*b* and locked by screws 26 at two ends of the print head 12*b*, and the print head 12*c* for discharging blue (B) ink is mounted in the adapter bar 13*c* and locked by screws 26 at two ends of the print head 12*c*. The screws 26 can be adjusted to limit a rotation about x-axis and y-axis of the print heads (12*a*, 12*b*, and 12*c*) relative to the adapter bars (13*a*, 13*b*, and 13*c*).

The adapter bars (13*a*, 13*b*, and 13*c*) are mounted in apertures (110*a*, 110*b*, and 110*c*) on the bottom surface 111 of the print head frame 11, and bolted on the bottom surface 111 of the print head frame 11 by screws 27. The adapter bars (13*a*, 13*b*, and 13*c*) reside in the x-y plane. The screws 27 can be adjusted to limit nonrotational displacement of the print heads along z-axis. The apertures (110*a*, 110*b*, and 110*c*) are shaped to limit the rotation of the adapter bars (13*a*, 13*b*, and 13*c*) about x-axis and y-axis, and configured for determining and fixing the relative position between the print heads (12*a*, 12*b*, and 12*c*). It is to be understood that the apertures (110*a*, 110*b*, and 110*c*) should have enough space, so that the adapter bars (13*a*, 13*b*, and 13*c*) mounted in the apertures (110*a*, 110*b*, and 110*c*) can move along x or y direction, or rotate in x-y plane. The print heads (12*a*, 12*b*, and 12*c*) receive ink from an ink reservoir (not shown) in communication with the print heads (12*a*, 12*b*, and 12*c*).

Figure 3:
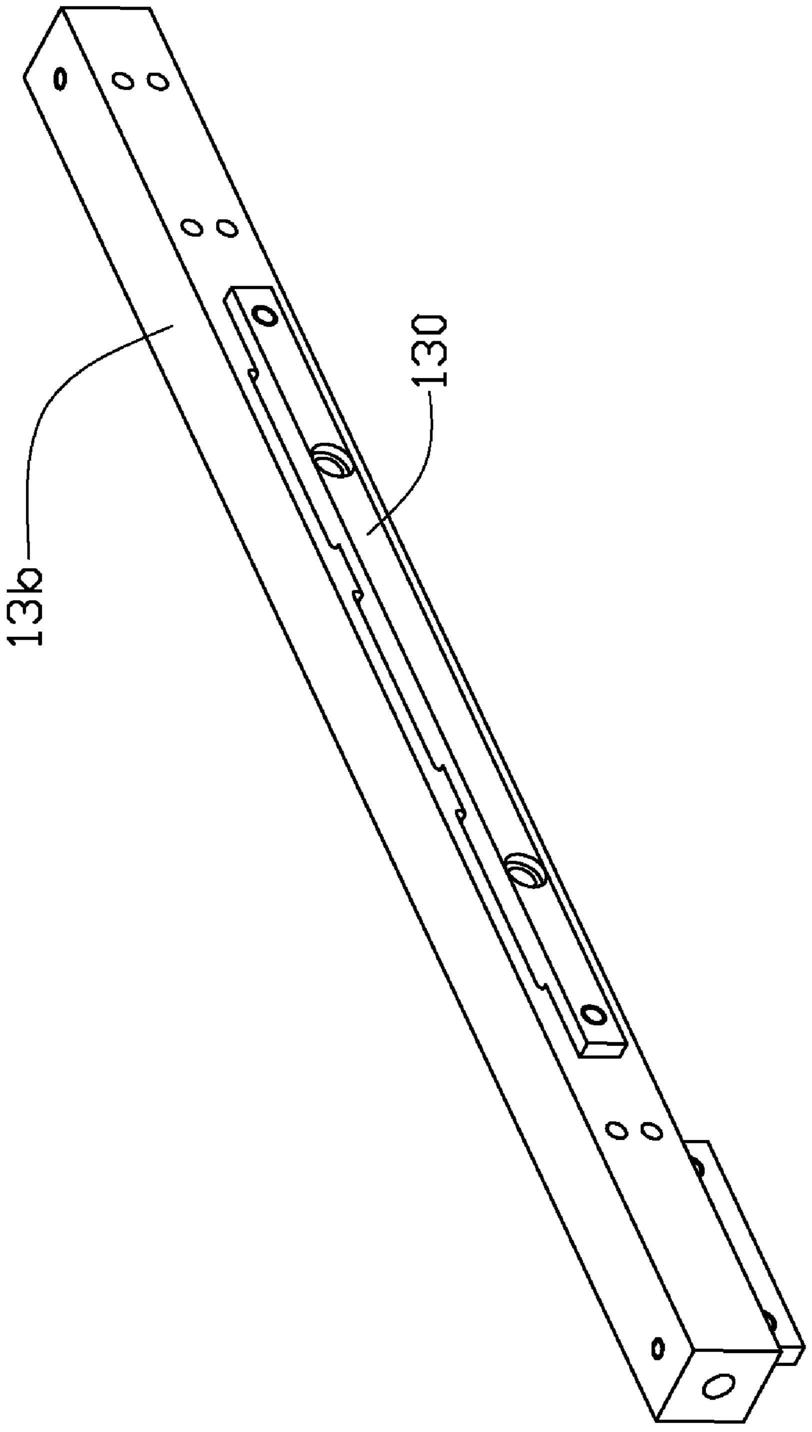
FIG. 3 is a perspective view of the adapter bar shown in FIG. 1.

Heater bars 130 are attached to respective adapter bars (13*a*, 13*b*, and 13*c*), the adapter bar 13*b* and the heater bar 130 are illustrated in FIG. 3 for example. Ink around the heater bar 130 can boil and for bubbles by supplying predetermined driving pulses (driving signals) to the heater bar 130. The volume expansion of the bubbles causes the ink to be pushed out from the nozzles, thus performing ink discharging. Accordingly, the size of bubbles can be adjusted by controlling the driving pulses applied to the heater bar 130, thereby controlling the volume of the ink discharged from the nozzles.

Figure 4:
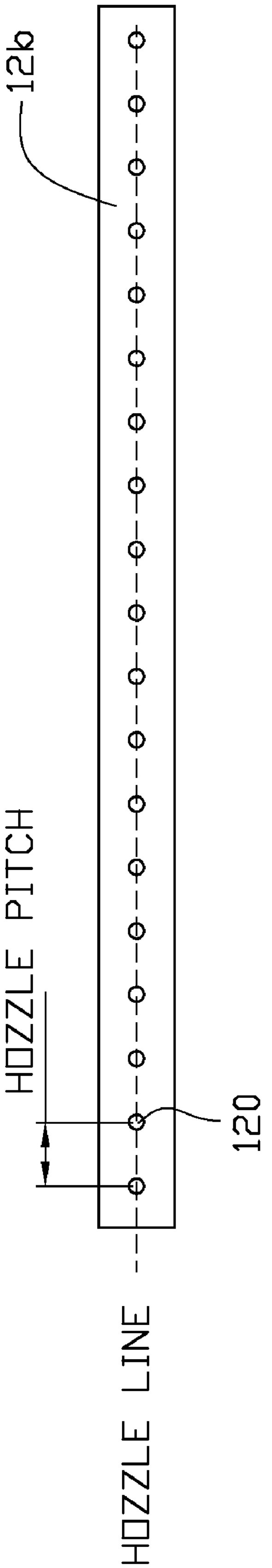
FIG. 4 is a schematic view of the print head shown in FIG. 1.

Referring to FIG. 4, each print head (12*a*, 12*b*, and 12*c*) includes a plurality of nozzles 120. The nozzles 120 in the preferred embodiment are spaced along a line perpendicular to the z-axis, and the line is called a nozzle line. The print heads (12*a*, 12*b*, and 12*c*) in the print head unit 10 are arranged in a manner such that all the print heads (12*a*, 12*b*, and 12*c*) are rotated simultaneously and the nozzle line of the central print head 12*b* crosses the z-axis of the print head unit 10. The central print head 12*b* is fixed in the print head unit 10, to say the position of the adapter bar 13*b* for mounting the print head 12*b* is fixed on the bottom surface 111 of the print head frame 11. The nozzle lines of the side print heads (12*a* and 12*c*) are parallel with the nozzle line of the central print head 12*b* by predetermined spacing. In the process of making a color filter, the print heads (12*a*, 12*b* and 12*c*) deliver ink into cells in the color filter. It is to be understood that a fewer or greater number of print heads can be provided.

Referring to FIGS. 1 and 2 again, piezoelectric motors 14 cooperate with capacitive sensors 15 to adjust the nozzle lines of the side print heads (12*a* and 12*c*) parallel with the nozzle line of the central print head 12*b*. A first piezoelectric motor 14 is attached to one end of the print head 12*a* configured for moving the print head 12*a* in a traverse direction away from or near to the nozzle line of the central print head 12*b* in one end, while the other end of the print head 12*a* is pivoted. A second piezoelectric motor 14 is attached to one end of the print head 12*c* to parallel the print head 12*c* with the print head 12*b* as described.

The parallelism of the side print heads (12*a* and 12*c*) with respect to the central print head 12*b* can be detected by the capacitive sensors 15 disposed in between and connected to the side print heads (12*a* and 12*c*) and the central print head 12*b*. Various configurations are known in the art for such capacitive sensors 15 and the piezoelectric motors 14, and in many cases a particular electrode configuration can provide either function. Motion of the print head 12*a* with respect to the central print head 12*b* is detected by measuring capacitance between one end of the print head 12*a* and the print head 12*b*, and measuring capacitance between the other end of the print head 12*c* and the print head 12*b*. Motion of the print head 12*c* with respect to the print head 12*b* is detected in the same way described above. The piezoelectric motors 15 can actuate the side print heads (12*a* and 12*c*) by closing a loop with the capacitive sensors 14.

It may be necessary to rotate the print head unit to normalize nozzle pitches with cell pitches. For example, in the event of performing angle adjustment of the print head unit 10, the print head unit 10 is rotated by an amount of theta around the z axis, in order that the nozzle pitches along the x axis of the print head 12*b* correspond to the cell pitches of the R cells along the x axis. Thus, the nozzle pitches of the print head 12*b* correspond to the cell pitches on the substrate. However, the nozzle pitches of the side print heads (12*a* and 12*c*) do not correspond to the cell pitches on the substrate.

Stepper motors 16 cooperate with optical encoders 17 to move the side print heads (12*a* and 12*c*) along the nozzle line independently, such that the projection of the nozzle pitches on the substrate perpendicular to the scanning direction is the same as that of the cells in the same direction. A first stepper motor 16 is attached to the other end of the print head 12*a* for moving the print head 12*a* along the nozzle line of the print head 12*a*. A second stepper motor 16 is attached to the other end of the print head 12*c* for moving the print head 12*c* alone the nozzle line of the print head 12*c*. The position of the side print heads (12*a* and 12*c*) along the nozzle line can be detected by the optical encoders 17 disposed between and connected to the side print heads (12*a* and 12*c*). The stepper motors 16 are assisted by the optical encoders 17 for the position correction. To ensure submicron accuracy, a resolution of the optical encoder 17 is 0.1 μm below.

Figure 5:
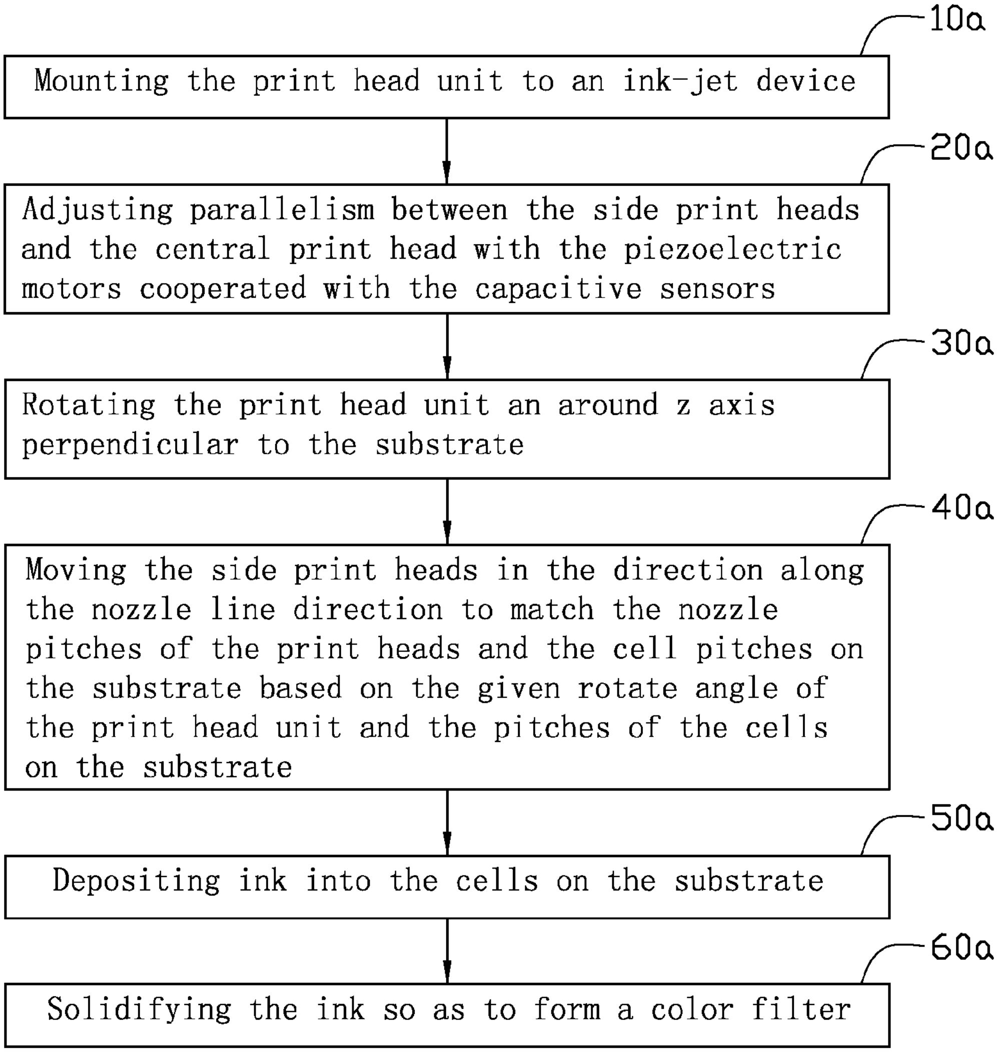
FIG. 5 is a flowchart illustrating a method for manufacturing a color filter on a substrate in accordance with the preferred embodiment.

Referring to FIG. 5, a flowchart of coloring a color filter using the print head unit 10 is shown. The process mainly includes the steps of: (10*a*) mounting the print head unit 10 to an ink-jet device; (20*a*) making the side print heads (12*a* and 12*c*) and the central print head 12*b* parallel with the piezoelectric motors 14 cooperating with the capacitive sensors 15; (30*a*) rotating the print head unit 10 around the z axis perpendicular to the substrate; (40*a*) moving the side print heads (12*a* and 12*c*) along the nozzle line to correspond to the nozzle pitches of the print heads (12*a*, 12*b*, and 12*c*) and the cell pitches on the substrate based on the rotation angle of the print head unit 10 and the pitches of the cells on the substrate; (50*a*) depositing ink into the cells on the substrate; and (60*a*) solidifying the ink so as to form a color filter. Coloring a color filter using the print head unit 10 is described in detail as follows.

In step 10*a*, the print head unit 10 is mounted to an ink jet device. In the present embodiment, a bubble jet type print head unit 10 is used, but a piezo-jet type print head unit may also be used.

In step 20*a*, voltage is applied to the piezoelectric motors 14 to adjust the spacing between the side print heads (12*a* and 12*c*) and the central print head 12*b*. The voltage is determined by the capacitive sensors 15. The piezoelectric motors 14 actuate the print head (12*a* and 12*c*) by closing a loop with the capacitive sensors 15.

The side print heads (12*a* and 12*c*) and the central print head 12*b* can be made parallel in the process described, but further adjustment is preferable to manufacture a better color filter with defects such as mixing of colors and blank spots being reduced even further. With the present embodiment, the steps including step 200*a* and step 200*b* described next are subsequently performed.

Figure 6:
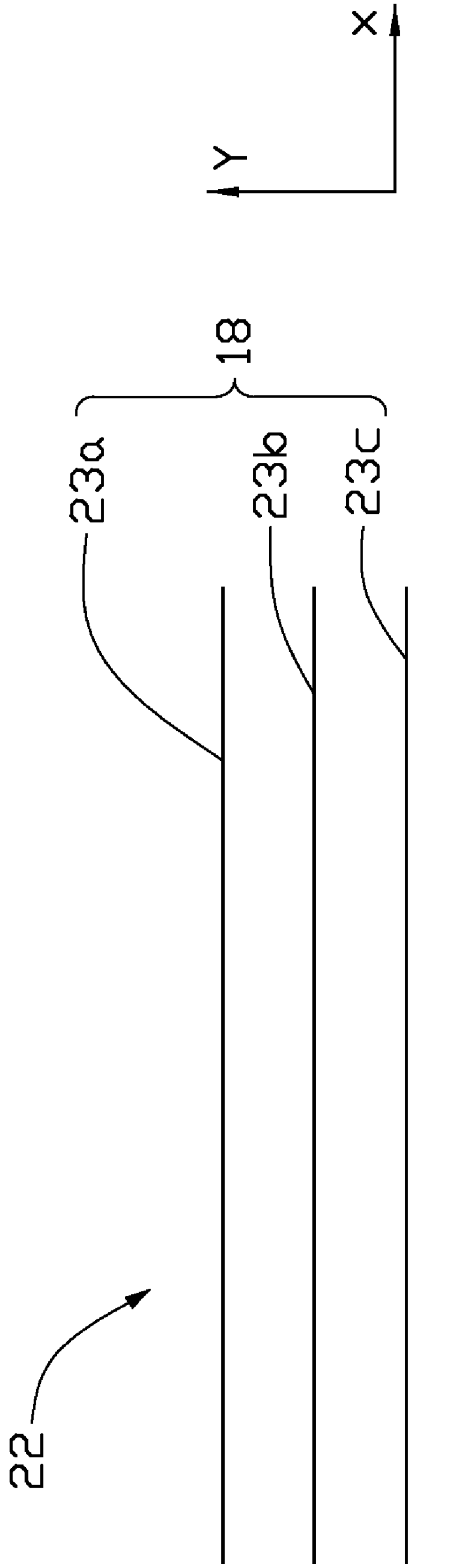
FIG. 6 is a diagram illustrating a first ink dot placement pattern.

First, in step 200*a*, ink is discharged toward the substrate 22 from the nozzles of the print heads (12*a*, 12*b*, and 12*c*), thereby forming a first ink dot placement pattern 18. During the process, the print head is not moved, and the plane resided with the three nozzle lines of the print heads (12*a*, 12*b*, and 12*c*) is parallel to the substrate 22. FIG. 6 shows the ink dot lines (23*a*, 23*b*, and 23*c*) of the print heads (12*a*, 12*b*, and 12*c*).

Secondly, in step 200*b*, the ink dot placement pattern 18 is identified, and about it is determined whether the ink dot placement pattern 18 is parallel. If so, adjustment of the print heads (12*a*, 12*b*, and 12*c*) is. If not, the piezoelectric motors 14 actuate the print heads (12*a*, 12*b*, and 12*c*) by closing a loop with the capacitive sensor 15. Adjustment of the print heads is thus completed.

Figure 7:
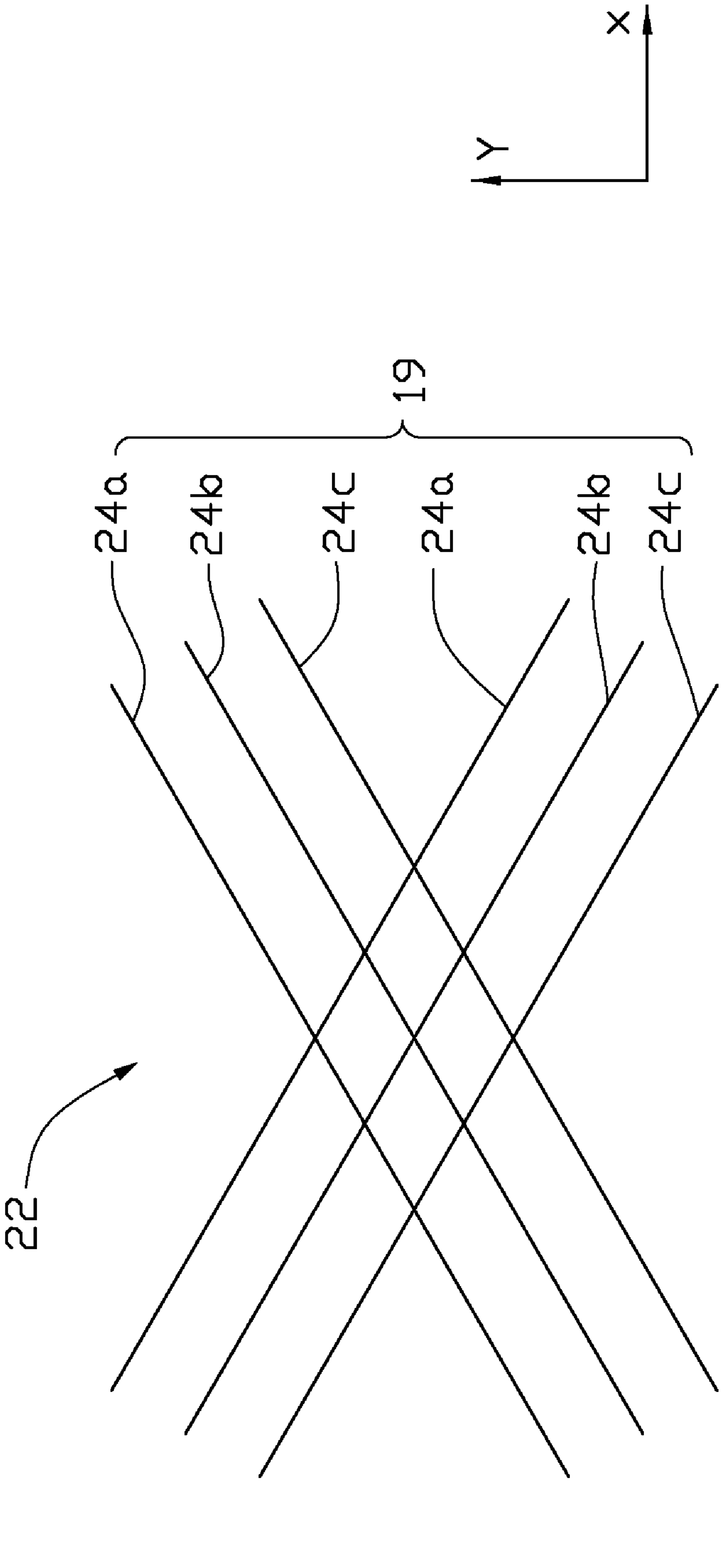
FIG. 7 is a diagram illustrating a second ink dot placement pattern.

Once the print heads are parallel, another two sets of data is required when the print head unit 10 is rotated at two different angles, e.g., −30° and 30° with x direction around z axis. Firstly, ink is discharged toward the substrate 22 from the nozzles of the print heads (12*a*, 12*b*, and 12*c*) when the print head unit 10 is rotated on two different angles separately, thereby forming a second ink dot placement pattern 19. The position of a rotational center O of the print head unit is calculated. FIG. 7 shows the ink dot lines (24*a*, 24*b*, and 24*c*) of the print heads (12*a*, 12*b*, and 12*c*) in two different angles together with the rotational center O.

Figure 8:
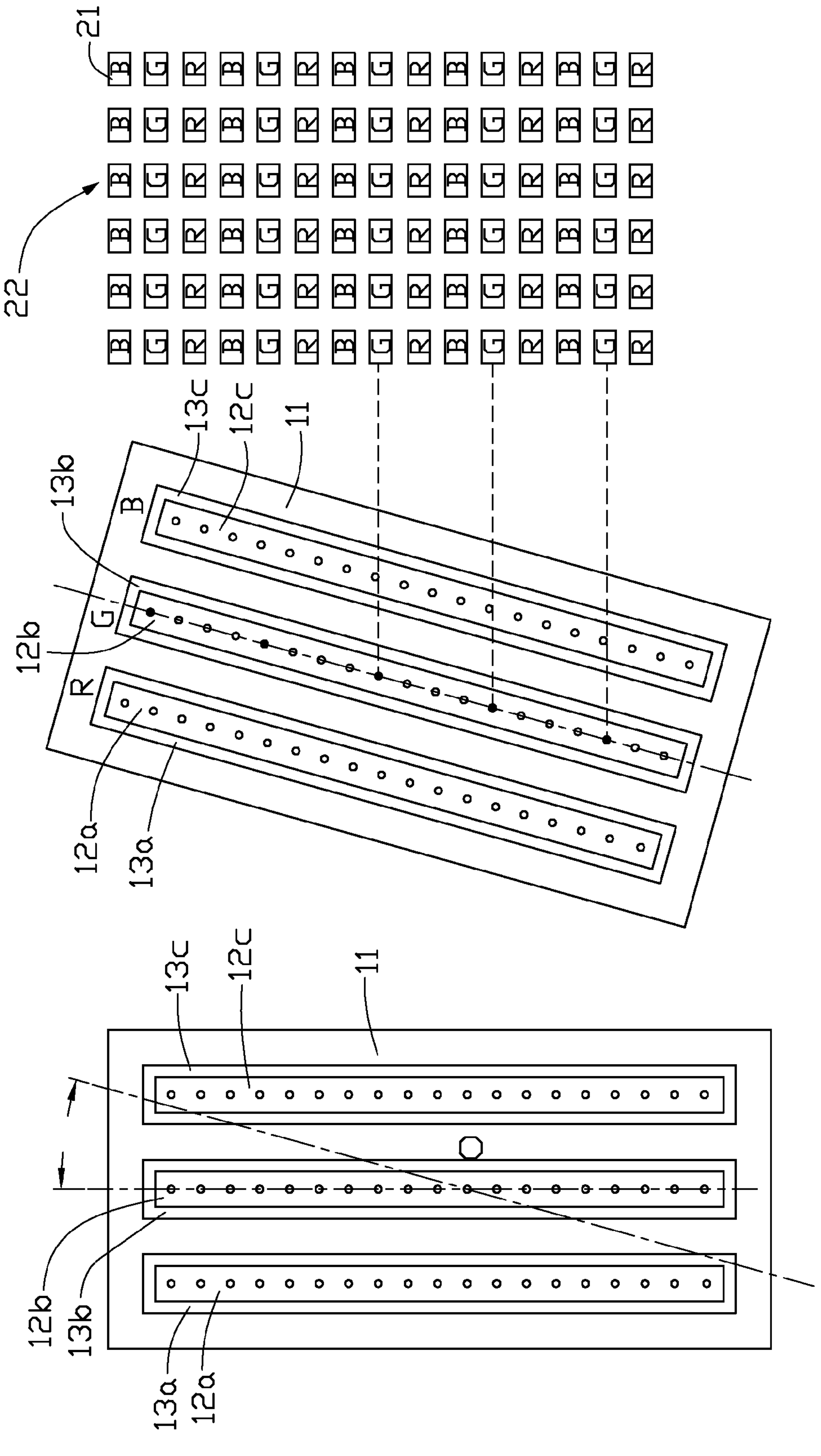
FIG. 8 is a diagram a state when the print head unit in FIG. 1 rotates an angle theta around a rotational center calculated by the second ink dot placement pattern in FIG. 7.
Figure 9:
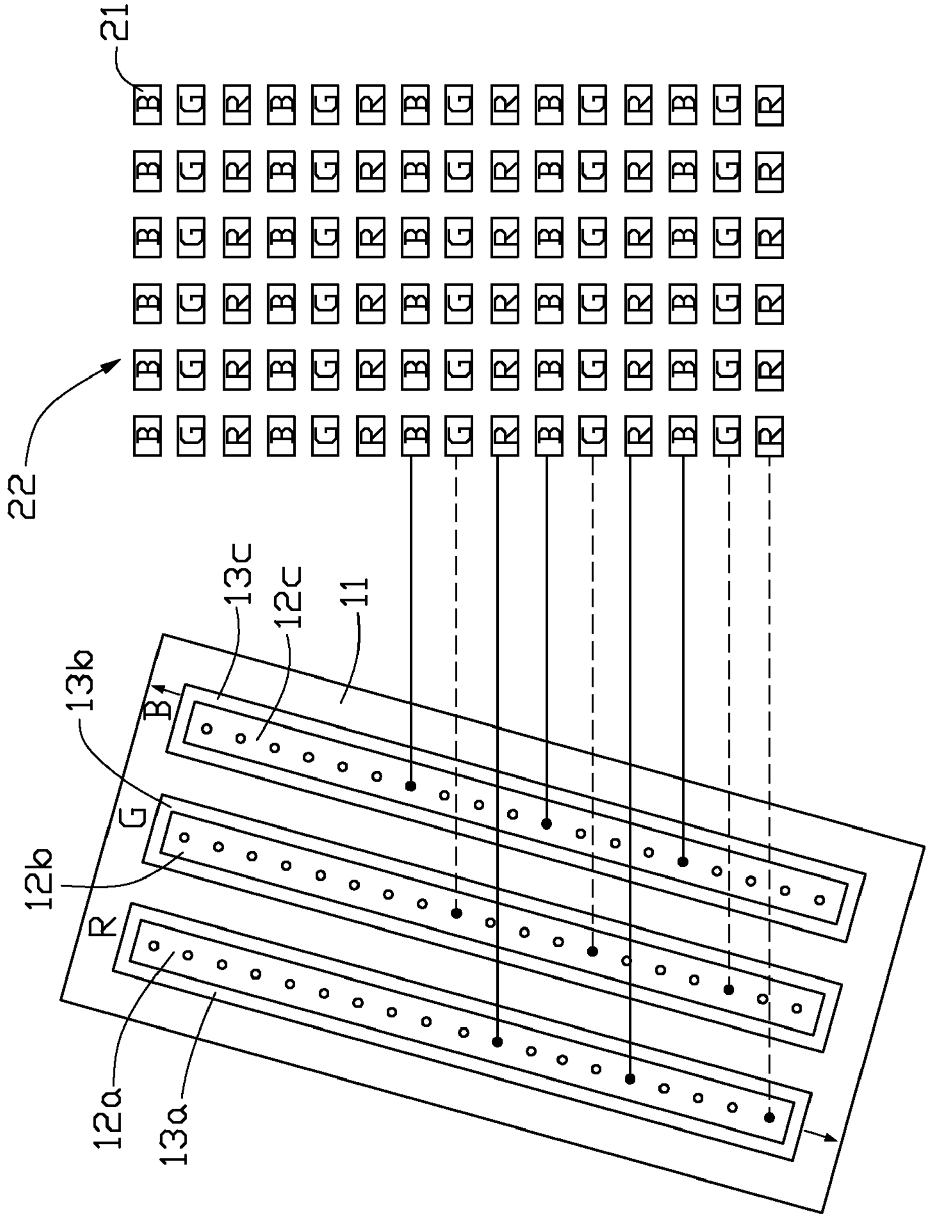
FIG. 9 is a diagram a state when the print head unit is adjusted after rotating theta around the rotational center so as to correspond to the cell pitch of the color filter.

Referring to FIGS. 8 and 9, in step 40*a*, firstly, the print head unit 10 is rotated by an amount of theta around the rotational center O, so that the nozzle pitches along the x axis of the print head 12*b* corresponds to the cell pitches of the R cells along the x axis. Then, the adapter bars (13*a* and 13*c*) are moved along the nozzle line. The position adjustment is performed for the adapter bars (13*a* and 13*c*), so that cells 21 on the substrate 22 can additionally be colored with the print heads 12*a* and 12*c*. The adapter bars (13*a* and 13*c*) are actuated by the stepper motors, which cooperate with the optical encoders. In order to determine whether the position of the nozzles is correctly adjusted, the steps including step 400*a* and step 400*b* described next are subsequently performed. In the step 400*a* after moving the adapter bars (13*a* and 13*c*) along the respective nozzle line of the adapter bars (13*a* and 13*c*), ink is discharged in the substrate to form a third ink dot placement pattern. Then, in the step 400*b* the third ink dot placement pattern is read, and the re-adjustment is made based on the reading results. If the re-adjustment eliminates the positional offset, the coloring of the color filter is started, i.e. the step 50*a* is started.

Although the present embodiment described involves the re-adjustment of the parallelism between the print heads (12*a*, 12*b*, and 12*c*) being performed before rotating the print head unit 10, an arrangement may be used wherein the re-adjustment is performed after completing the rotational center O adjustment of the print head unit 10 and the positional adjustment of the adapter bars (13*a*, 13*b*, and 13*c*). In this step, positional offset in the ink dot placement is eradicated by performing at least one of: parallelism adjustment between the print heads (the adjustment in steps 200*a* and 200*b*), the rotational center O adjustment of print heads, and adjustment of the adapter bars along the nozzle line (the adjustment in step 30*a*).

According to the present embodiment thus described, a print head unit for holding and adjusting the print heads in multi degree-of freedoms independently to adjust the nozzle pitches of the print heads (12*a*, 12*b*, and 12*c*) correspond to cell pitches on the substrate is provided. The positional adjustment between the print heads can be easily performed even in the event that the number of print heads being used is increased, and consequently, prolonged periods of time are no longer necessary for positioning the print heads such as conventionally occurred due to the increase in the number of print heads, and also the color filter is manufactured using print head unit having multiple print heads of the same color, so the area which can be colored at once is wider than with conventional arrangements, which leads to proportionate reduction in coloring time. Also, large substrate can be colored by proportionately increasing the number of heads, thereby allowing color filters to be manufactured without reducing production.

Note that the above description has been made with reference to an example of a print head unit used with an apparatus for manufacturing a color filter, but the same can be used in manufacturing EL formed by applying self-illuminating material (EL light-emitting material) in recession surrounded by partitions provided upon a substrate. Further other than such color filters and EL display devices, the same can be used in manufacturing display device panels formed by discharging display material on a substrate.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A method for manufacturing a patterned layer on a substrate, the substrate defining an array of cells, comprising the steps of:

mounting a print head unit to an ink-jet device, wherein the print head unit comprises at least two side print heads and one central print head disposed between the side print heads, the side print heads and the central print head each comprises a nozzle line with a plurality of nozzles arranged in a line, the side print heads and the central print head are arranged in a manner that all the print heads are rotatable about a rotating axis of the print head unit and the nozzle line of the central print head crosses the rotating axis;

rotationally moving at least one of the side print heads relative to the central print head to attain parallelism between the side print heads and the central print head;

rotating the print head unit an angle around the rotating axis perpendicular to the substrate;

linearly moving the side print heads in the nozzle line direction to correspond to pitches of the nozzles of the side print heads and that of cells on the substrate;

depositing ink into the cells on the substrate; and solidifying the ink so as to form a patterned layer on the substrate.

2. The method as claimed in claim 1, wherein the rotationally moving includes at least one of the side print heads in a traverse direction departing from or near to the nozzle line of the central print head in one end, while another end of which is pivoted.

3. The method as claimed in claim 2, wherein the rotationally moving step attains parallelism by applying a voltage to the parallel adjustment.

4. The method as claimed in claim 2, wherein the parallel attainment includes at least one piezoelectric motor and at least one capacitive sensor, and the at least one piezoelectric motor actuates the side print heads by closing a loop with the at least one capacitive sensor.

5. The method as claimed in claim 1, wherein the linearly moving is performed using position adjustment comprising at least one stepper motor and at least one optical encoder, wherein the at least one stepper motor and the at least one optical encoder cooperates to move the side print heads in the nozzle line direction independently.

* * * * *